US012626622B2

(12) United States Patent
Kim et al.

(10) Patent No.: US 12,626,622 B2
(45) Date of Patent: May 12, 2026

(54) DISPLAY DEVICE

(71) Applicant: LG DISPLAY CO., LTD., Seoul (KR)

(72) Inventors: Sun-Woong Kim, Paju-si (KR); Dong-Hyeok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 595 days.

(21) Appl. No.: 18/083,609

(22) Filed: Dec. 19, 2022

(65) Prior Publication Data

US 2023/0206791 A1      Jun. 29, 2023

(30) Foreign Application Priority Data

Dec. 24, 2021      (KR) ......................... 10-2021-0187715

(51) Int. Cl.
*G09G 3/00* (2006.01)
*F21V 8/00* (2006.01)

(52) U.S. Cl.
CPC ........... *G09G 3/002* (2013.01); *G02B 6/0031* (2013.01); *G09G 2320/028* (2013.01); *G09G 2340/0407* (2013.01)

(58) Field of Classification Search
CPC ...................................................... G09G 3/002
See application file for complete search history.

(56) References Cited

U.S. PATENT DOCUMENTS 10,282,912 B1 * 5/2019 Yuan ........................ G06F 3/013
2016/0370855 A1 * 12/2016 Lanier ................... H04N 23/58
2019/0088904 A1 * 3/2019 Cho ..................... H10K 50/844

FOREIGN PATENT DOCUMENTS

CN      107544145 A      1/2018
CN      109302594 A      2/2019
KR      20190033116 A      3/2019
KR      10-2129669      6/2020

OTHER PUBLICATIONS

Office Action in Chinese Appln. No. 202211631528.X, mailed on Apr. 30, 2025, 17 pages (with English translation).
Office Action in Korean Appln. No. 10-2021-0187715, mailed on Oct. 21, 2025, 15 pages (with English translation).

* cited by examiner

*Primary Examiner* — Edmond C Lau
(74) *Attorney, Agent, or Firm* — Fish & Richardson P.C.

(57) ABSTRACT

A display device includes a first display panel realizing a first image light of a first resolution; and a second display panel realizing a second image light synchronized with the first image light, the second image light having a second resolution lower than the first resolution, wherein a second virtual image implemented by the second image light is superimposed with a first virtual image implemented by the first image light to implement a virtual reality image.

10 Claims, 10 Drawing Sheets

FIG. 4A
FIG. 4B
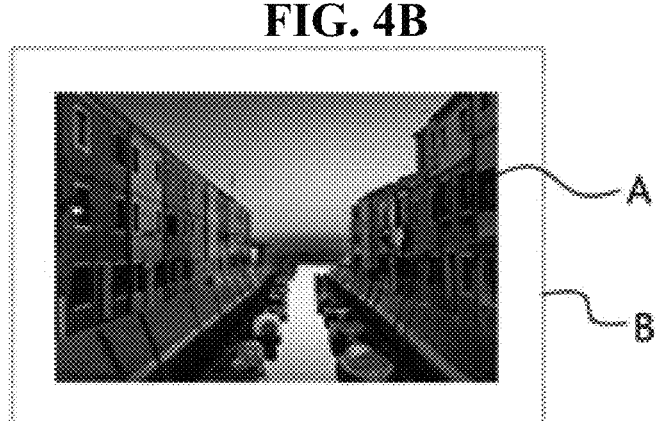
FIG. 4C
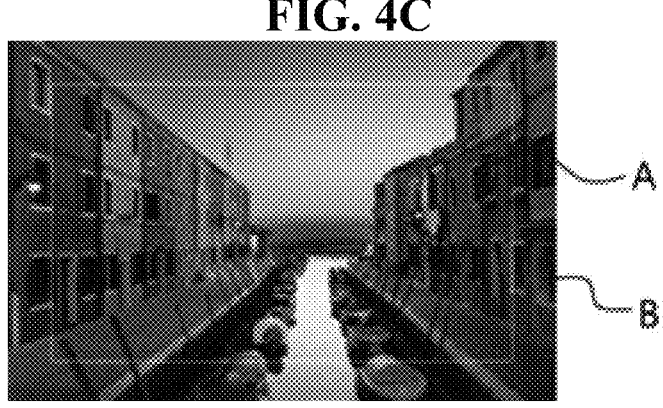

DISPLAY DEVICE

CROSS REFERENCE TO RELATED APPLICATION

The present application claims the priority of Korean Patent Application No. 10-2021-0187715 filed on Dec. 24, 2021, which is hereby incorporated by reference in its entirety for all purposes as if fully set forth herein.

BACKGROUND

Field of the Invention

The present disclosure relates to a display device for displaying an image, more particularly, to a display device for displaying a virtual reality (VR).

Discussion of the Related Art

Recently, devices for providing an image to a user using a virtual reality device (VR) have been developed.

A virtual reality refers to an interface between a human and a computer that makes a specific environment or situation on a computer and makes it as if a user using it is interacting with a real surrounding situation or environment. The virtual reality allows people to see and manipulate environments that are difficult to experience on a daily basis without directly experiencing them.

Such the virtual reality can be applied to fields such as education, advanced programming, remote operation, remote satellite surface exploration, exploration data analysis, and scientific visualization.

Here, the virtual reality device is a device to which a virtual reality technology is applied to increase a sense of immersion for a single user experiencing the virtual reality, and in particular, a display device for maximizing a sense of visual immersion is considered the most important.

For example, a Head Mounted Display (HMD), a Face Mounted Display (FMD), and an Eye Glasses-type Display (EGD) are representative virtual reality devices.

Meanwhile, the virtual reality device needs to display a high-resolution image in order to prevent a recognition of pixelation, and it is very difficult to implement a high-resolution image in consideration of a human's viewing angle.

SUMMARY

Accordingly, the present disclosure is directed to a display device that substantially obviates one or more of the problems due to limitations and disadvantages described above.

More specifically, the present disclosure is to provide a display device which can provide a high-resolution virtual reality device.

The present disclosure is also to provide a display device which can provide a virtual reality device capable of further improving a three-dimensional effect, a sense of reality, and a sense of immersion.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the present disclosure, as embodied and broadly described herein, a display device includes a first display panel realizing a first image light of a first resolution; and a second display panel realizing a second image light synchronized with the first image light, the second image light having a second resolution lower than the first resolution, wherein a second virtual image implemented by the second image light is superimposed with a first virtual image implemented by the first image light to implement a virtual reality image.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate embodiments of the disclosure and together with the description serve to explain the principles of the disclosure.

In the drawings:

FIG. 4A shows a second virtual image implemented in first, second and second, second display panels; c FIG. 4B shows a first virtual image implemented in first, first and second, first display panels;

FIGS. 4C and 4D show virtual reality images implemented through a virtual reality device according to an embodiment of the present disclosure;

DETAILED DESCRIPTION

Hereinafter, an embodiment according to the present disclosure is described with reference to the drawings.

Figure 1A:
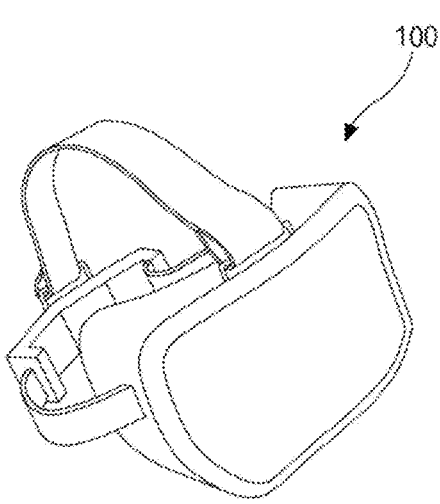
FIG. 1A is a perspective view schematically illustrating a virtual reality device according to an embodiment of the present disclosure.
Figure 1B:
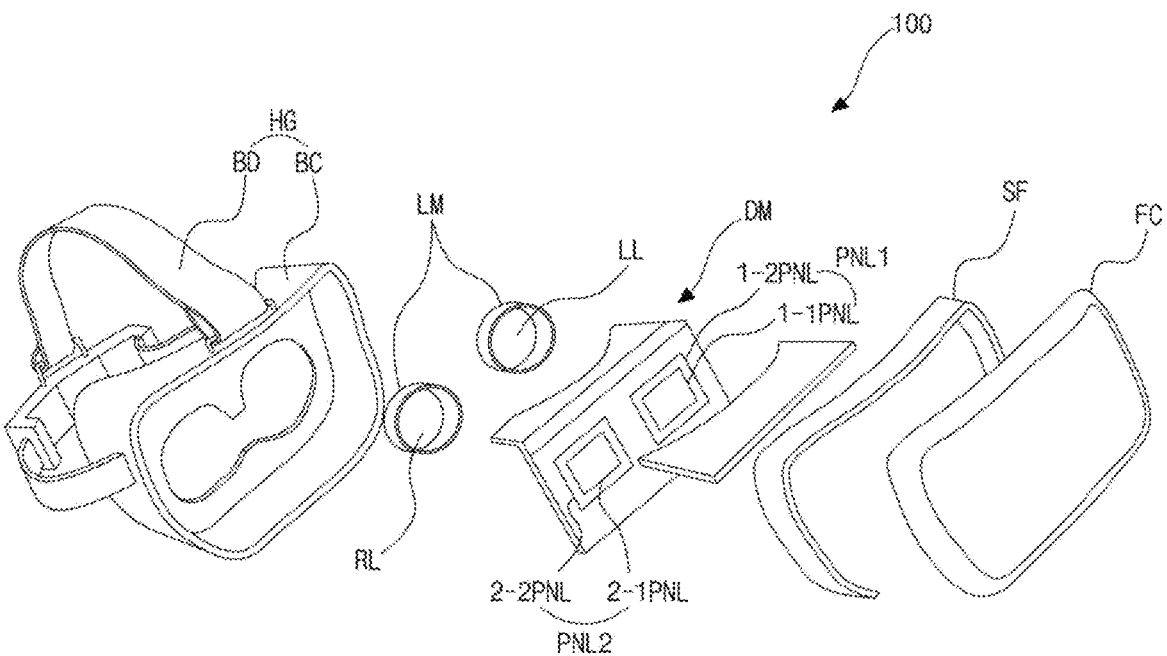
FIG. 1B is an exploded perspective view of the virtual reality device of FIG. 1A.

FIG. 1A is a perspective view schematically illustrating a virtual reality device according to an embodiment of the present disclosure, and FIG. 1B is an exploded perspective view of the virtual reality device of FIG. 1A.

As shown in FIGS. 1A to 1B, the virtual reality device 100 may include a lens module LM, a display device module DM, a main board MB, a head gear HG, a side frame SF, and a front cover FC.

The display device module DM may include a display panel and a display panel driving circuit for driving the display panel to display an input image received from the main board MB.

The display panel may be divided into a first display panel module PNL1 viewed through a user's left eye and a second display panel module PNL2 viewed through a user's right eye. The display device module DM may display image data inputted from the main board MB on the display panel modules PNL1 and PNL2.

Here, the image data may be 2D/3D image data that implements an image of virtual reality (VR).

The main board MB may include a processor that executes a virtual reality software and supplies a left eye image and a right eye image to the display module DM. Also, although not shown in the drawings, the main board MB may further include an interface module connected to an external device, a sensor module, and the like. The interface module may be connected to the external device through an interface such as a universal serial bus (USB) or high definition multimedia interface (HDMI).

The sensor module may include various sensors such as a gyro sensor and an acceleration sensor.

The processor of the main board MB may correct the left eye and right eye image data received through the interface module in response to an output signal of the sensor module, and transmits the left eye and right eye image data to the display module DM.

The processor may generate a left-eye image and a right-eye image suitable for a resolution of the display panel based on a depth information analysis result of a 2D image, and transmit the generated images to the display module DM.

The lens module LM may be an imaging lens that provides a viewing angle of a screen provided to the user's left and right eyes in a range greater than a viewing angle of the user's left and right eyes. The imaging lens may use a pair of fisheye lenses, which are a kind of ultra-wide-angle lens to widen a viewing angle range of the screen.

The pair of fisheye lenses may include a left eye lens LL disposed in front of the first display panel module PNL1 and a right eye lens RL disposed in front of the second display panel module PNL2.

The side frame SF may be fixed between the headgear HG and the front cover FC to secure an internal space in which the lens module LM, the display device module DM, and the main board MB are disposed.

The virtual reality device 100 according to the embodiment of the present disclosure may be implemented in a head mounted display (HMD) structure, but is not limited thereto. For example, the virtual reality device 100 according to an embodiment of the present disclosure may be designed as an EGD (Eye Glasses-type Display) having a glasses structure.

Here, the virtual reality device 100 according to an embodiment of the present disclosure can implement a high-resolution image, thereby improving a three-dimensional effect, a sense of reality, and a sense of immersion.

In this regard, the first and second display panel modules PNL1 and PNL2 of the virtual reality device 100 according to the embodiment of the present disclosure may be respectively configured to include a first, first display panel 1-1PNL and a first, second display panel 1-2PNL, and a second, first display panel 2-1PNL and a second, second display panel 2-2PNL, based on the user's viewing angle.

That is, the display panel may be divided into a first display panel module PLN1 for the left eye and a second display panel module PLN2 for the right eye. In addition, the first display panel module PNL1 for the left eye may be divided into the first, first display panel 1-1PNL and the first, second display panel 1-2PNL, and the second display panel module PNL2 for the right eye may be divided into the second, first display panel 2-1PNL and the second, second display panel 2-2PNL.

The first, first and first, second display panels 1-1PNL and 1-2PNL and the second, first and second, second display panels 2-1PNL and 2-2PNL may have different resolutions based on the viewing angles of the user's left and right eyes.

Figure 2A:
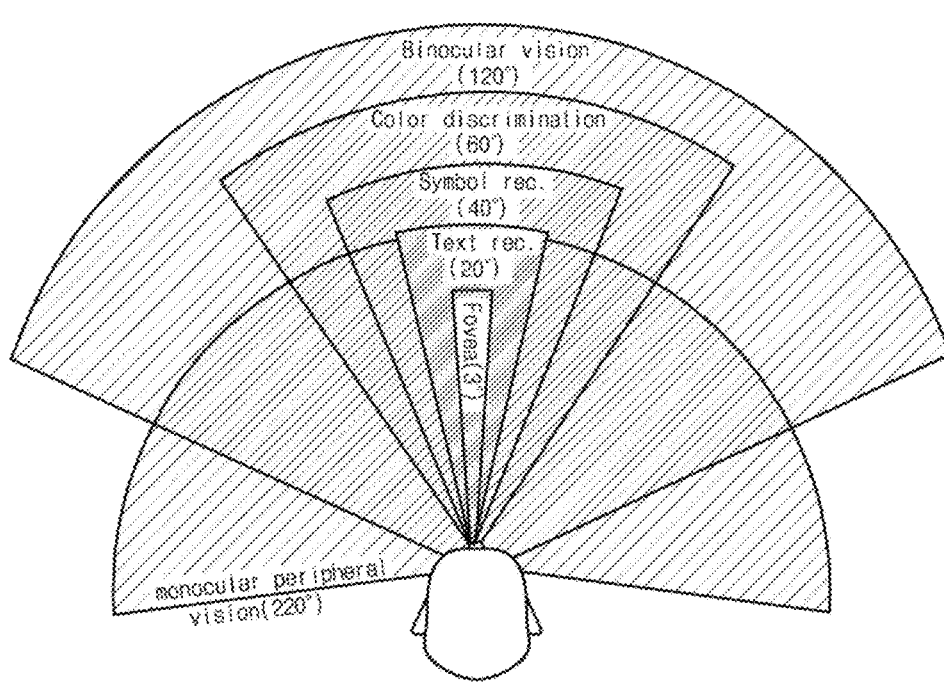
FIGS. 2A and 2B are schematic views illustrating viewing angle ranges of a human.
Figure 2B:
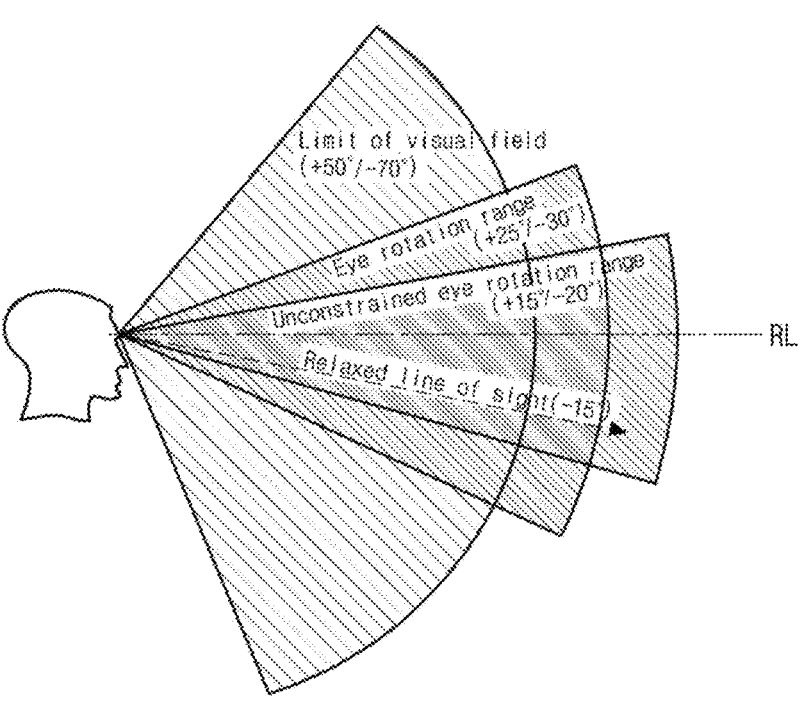

Here, referring to FIGS. 2A and 2B, a human horizontal viewing angle range is 220 degrees or more, which forms an entire viewing range of both eyes. However, the actual binocular viewing range is 120 degrees in most cases, depending on a geometry of a human's nose. In addition, a range of color discrimination is 60 degrees, a range of symbol recognition is 40 degrees, and a range of text recognition is 20 degrees, which are formed in small viewing angle ranges. A Fovea range which is the most clearly recognizable viewing range is formed much smaller by 2 to 3 degrees.

In addition, a human vertical viewing angle range is similar to the horizontal viewing angle range. However, the vertical viewing angle range has an asymmetrical entire viewing range of 50 degrees upward and 70 degrees downward from a reference line RL extending in a Z-axis direction as the horizontal direction from the eye.

The human vision is a dynamic concept and is best explained when considering a limited or unconstrained range of eye movement, and an unconstrained eye movement does not cause eye strain and allows for a steady gaze and consequent accommodative reflexes.

This may vary depending on a human age. However, an eye rotation range in which an eye movement is constrained is formed as large as 25 degrees upward and 30 degrees downward from the reference line RL, but an unconstrained eye rotation range in which an eye is not constrained becomes much smaller at 15 degrees upward and 20 degrees downward from the reference line RL.

As such, an appropriate central region of the human vertical and horizontal viewing angle ranges is about 15 to 45 degrees, and an appropriate central region of the Fovea range is about 30 degrees.

Therefore, the virtual reality device 100 according to the embodiment of the present disclosure may include the first and second display panel modules PNL1 and PNL2 such that the first, first and second, first display panels 1-1PNL and 2-1PNL each having a first resolution as a high resolution are located at the appropriate central regions corresponding to the Foveas of the eyes, and the first, second and second, second display panels 1-2PNL and 2-2PNL each having a second resolution lower than the first resolution are located at peripheral regions corresponding to peripheral viewing angles other than the appropriate central regions.

In this case, the first, first and second, first display panels 1-1PNL and 2-1PNL having the first resolution may be positioned within 30 degrees (±15 degrees) as the appropriate central region ranges of the vertical and horizontal viewing angles, and the first, second and second, second display panels 1-2PNL and 2-2PNL having the second resolution may be positioned within the range of 40 to 100 degrees as the peripheral regions.

Accordingly, the virtual reality device 100 according to an embodiment of the present disclosure may implement a high-resolution image. In addition, the virtual reality device 100 may match resolutions according to human viewing angles so that little or no pixelation in which a shape of a pixel is recognized in a virtual image is recognized, thereby preventing recognition of the pixelation from occurring.

Accordingly, a three-dimensional effect, a sense of reality and a sense of immersion of an image implemented in the virtual reality device 100 can be improved.

Figure 3:
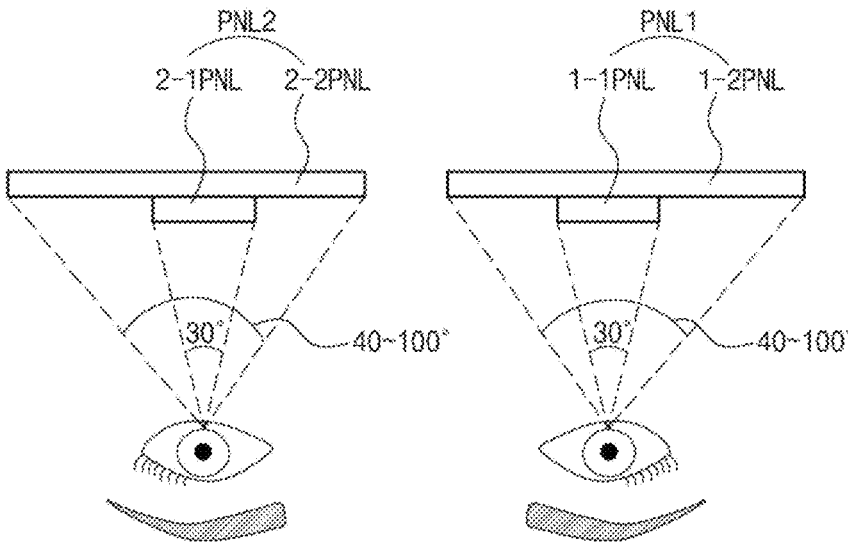
FIG. 3 is a schematic diagram illustrating a field of view of first and second display panel modules of a virtual reality device according to an embodiment of the present disclosure.

FIG. 3 is a schematic diagram illustrating a field of view of first and second display panel modules of a virtual reality device according to an embodiment of the present disclosure. FIG. 4A shows a second virtual image implemented in first, second and second, second display panels, and FIG. 4B shows a first virtual image implemented in first, first and second, first display panels.

Figure 4D:
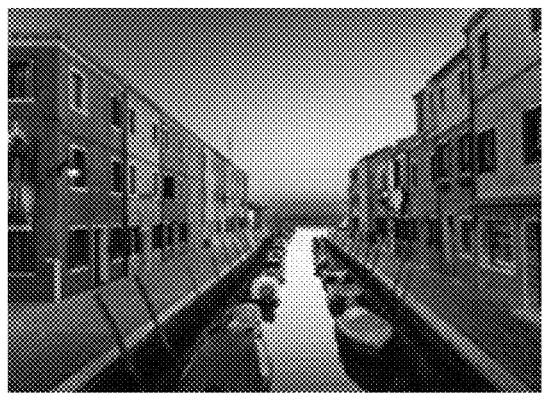

FIGS. 4C and 4D show virtual reality images implemented through a virtual reality device according to an embodiment of the present disclosure.

As shown in FIG. 3, the first, second and second, second display panels 1-2PNL and 2-2PNL each having the second resolution are positioned within 40 to 100 degrees, which is the peripheral region range of each of the right eye and left eye. the first, first and second, first display panels 1-1PNL and 2-1PNL each having the first resolution are positioned within 30 degrees (±15 degrees) which is the central region range of each of the right eye and left eye.

Here, images output from the first and second display panel modules PNL1 and PNL2 are synchronized and basically output based on the same original image. As shown in FIG. 4A, each of the first, second and second, second display panels 1-2PNL and 2-2PNL implements a second virtual image having a second resolution, and in this case, the second virtual image may have a definition of about 60 to 80%.

In this case, the second virtual image may be divided into a region A corresponding to a center and a region B defined along an edge of the region A.

In addition, as shown in FIG. 4B, each of the first, first and second, first display panels 1-1PNL and 2-1PNL implements a first virtual image which is the same image as the second virtual image but has a first resolution.

In this case, the first virtual image has a definition of 100% clarity, so that the first resolution is higher than the second resolution.

As described above, in the virtual reality device (100 of FIG. 1B) according to the embodiment of the present disclosure, the second virtual image having the second resolution is implemented within 40 to 100 degrees which is the peripheral region range, and the first virtual image having the first resolution is implemented within 30 degrees (±15 degrees) which is the central region range.

At this time, as the first virtual image falls within 30 degrees (±15 degrees) of the central region range, the first virtual image is implemented only at a region only corresponding to the region A of the second virtual image that falls within 40 to 100 degrees as the peripheral region range, and is cut out at a region corresponding to the region B of the second virtual image.

Therefore, to a user who wears the virtual reality device (100 of FIG. 1B) according to an embodiment of the present disclosure, the image of the region B of the second virtual image are superimposed (or overlapped) along the edge of the first virtual image with the first virtual image as a center, and the virtual reality image in which the first and second virtual images are mixed is provided, as shown in FIG. 4C.

Here, in the process of mixing the first and second virtual images, the second virtual image allows the region A to be cut out, thereby preventing the first virtual image and the second virtual image from interfering with each other.

In the virtual reality image provided to the user, the boundary between the first virtual image and the second virtual image may be blurred. More precisely, the edge of the first virtual image may be blurred corresponding to the second virtual image.

Accordingly, as shown in FIG. 4D, the boundary between the first virtual image and the second virtual image may not be recognized.

In particular, by setting the edge region of the first virtual image to have a resolution between the resolution of the first virtual image and the resolution of the second virtual image, the boundary between the first virtual image and the second virtual image may not be recognized.

Therefore, the virtual reality image implemented by mixing the first and second virtual images may have more naturalness as if it were a single image.

Here, the first virtual image is preferably implemented to have a resolution of at least 1000 PPI or higher, and the second virtual image is preferably implemented to have a resolution of about 100 PPI or higher.

Looking at this in more detail, a distance between the user's both eyes and the display panels 1-1PNL, 1-2PNL, 2-1PNL and 2-2PNL is very short, about several centimeters. The reason of arranging the display panels 1-1PNL, 1-2PNL, 2-1PNL and 2-2PNL adjacent to both eyes of the user is that an image is provided to be wider than the user's field of view so that the image feels the same as a real space.

At this time, simply placing the display panel 1-1PNL, 1-2PNL, 2-1PNL and 2-2PNL close to the user's eyes is equivalent to looking at the screen very closely, so the image cannot be recognized properly. In particular, edge portions of the display panels 1-1PNL, 1-2PNL, 2-1PNL and 2-2PNL are also recognized, thereby reducing a sense of reality. In order to give a sense of reality beyond simply placing the display panels 1-1PNL, 1-2PNL, 2-1PNL and 2-2PNL close to the eyes, the lens module (LM of FIG. 1) may be disposed between the display panels PNL, 1-2PNL, 2-1PNL and 2-2PNL and the user's both eyes.

Accordingly, when the user sees the images implemented in the display panels 1-1PNL, 1-2PNL, 2-1PNL and 2-2PNL through the lens module (LM of FIG. 1B), the user see the images magnified 4 to 5 times than the actual images displayed in the display panels 1-1PNL, 1-2PNL, 2-1PNL and 2-2PNL. When resolutions of the display panels 1-1PNL, 1-2PNL, 2-1PNL and 2-2PNL is low in such the close-view and lens module (LM of FIG. 1B) application environment, a pixelation is recognized and a reality of the image is reduced.

Accordingly, it is preferable that the virtual reality device (100 of FIG. 1B) has a resolution of 2K or higher, where K means 1000. For example, 1K means a resolution of about 1000 horizontal pixels, 2K means a resolution of about 2000, 4K means a resolution of about 4,000, and 8K means a resolution of about 8,000 pixels.

Here, even with the same resolution, a pixel size is different depending on a size of the display panels 1-1PNL, 1-2PNL, 2-1PNL and 2-2PNL. For example, between a 2.5-inch display and a 5-inch display panel having the same resolution of 2K, pixel sizes thereof have a difference that cannot be ignored.

Therefore, in addition to a resolution, a pixel density also needs to be considered. The pixel density uses a unit called PPI (Pixel Per Inch), which means a number of pixels per inch.

For example, if 1K resolution is implemented on a 5-inch display panel, a horizontal length of the display panel is 4 inches, and thus the display panel has a resolution of 250 PPI. If 2K resolution is implemented on a 5-inch display panel, the display panel has a resolution of 500 PPI. Meanwhile, if 1K resolution is implemented on a 2.5-inch display panel, a horizontal length becomes 2 inches, and thus the display panel has a resolution of 500 PPI. Similarly, if 2K resolution is implemented on a 2.5-inch display panel, the display panel has a resolution of 1000 PPI.

Here, it is preferable that in order to increase sense of reality and immersion, the virtual reality device (100 of FIG. 1B) according to the embodiment of the present disclosure has a high resolution, and a pixel size small enough not to be recognized by a proximity arrangement structure.

In this case, at a resolution of 1000 PPI or less, a pixelation occurs in which a shape of a pixel is recognized. Therefore, in the virtual reality device (100 of FIG. 1B) according to the embodiment of the present disclosure, it is preferable that the first virtual image implemented within 30 degrees (±15 degrees), which is the range of the central region of the user's eyes, has a high resolution of 1000 PPI or higher.

Through this, in the virtual reality device (100 of FIG. 1B) according to the embodiment of the present disclosure, the pixelation is prevented by displaying a high-resolution image, thereby improving a three-dimensional effect, a sense of reality and a sense of immersion.

In addition, by implementing the second virtual image within 40 to 100 degrees, which is the peripheral region range, to have 100 PPI, the virtual reality device (100 of FIG. 1B) according to the embodiment of the present disclosure may only need to consider distances between the both eyes and the display panels 1-1PNL, 1-2PNL, 2-1PNL and 2-2PNL corresponding to the peripheral region range. Thus, since the size of the virtual reality device (100 of FIG. 1B) does not increase even though a high resolution is implemented, light weight and thinness can also be implemented.

Figure 5:
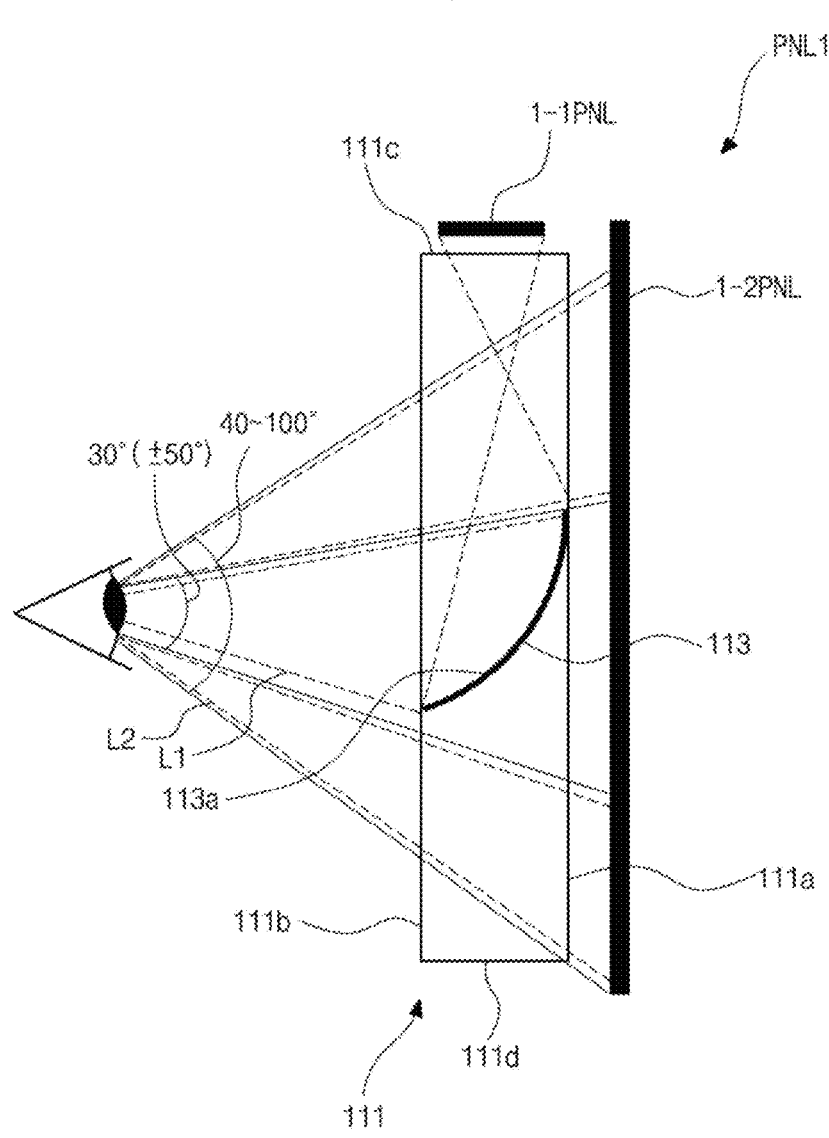
FIG. 5 is a schematic diagram illustrating a display panel module of a virtual reality device according to an embodiment of the present disclosure.

FIG. 5 is a schematic diagram illustrating a display panel module of a virtual reality device according to an embodiment of the present disclosure, and also shows an optical path therein.

Here, images respectively output from the first and second display panel modules (PNL1 and PNL2 of FIG. 1B) are synchronized and basically output based on the same original image. Hereinafter, for convenience of description, the first display panel module PNL1 is described as an example.

As shown in FIG. 5, the first display panel module PNL1 may include the first, first and first, second display panels 1-1PNL and 1-2PNL, a light guide part 111 and a semi-transmissive (or transflective) part 113.

The light guide part 111 may be positioned in front of the user's eyes. The light guide part 111 may have a lens shape that provides a field of view to the user, and may be formed of a material being transparent or translucent.

Therefore, the light guide part 111 may be formed of a plastic material such as polymethylmethacrylate (PMMA), which is an acrylic transparent resin as one of transmissive materials that can transmit light, or one selected from a polycarbonate (PC) series, a polystyrene (PS) series and a polymethacrylstyrene (MS) series. It is preferable to use PMMA which has excellent transparency, weather resistance and coloration and induces light diffusion when light is transmitted.

Here, the light guide part 111 may include a front surface 111a, a rear surface 111b, and a plurality of side surfaces 111c and 111d connecting the front surface 111a and the rear surface 111b. In a state in which the virtual reality device (100 of FIG. 1B) is worn on the user's eyes, the front surface 111a is defined as an outer surface of the light guide part 111 i.e., a surface not facing the user's eyes, and the rear surface 111b is defined as an inner surface of the light guide part 111 i.e., a surface facing the eyes.

The first, first display panel 1-1PNL may be positioned outside one side surface 111c of the light guide part 111, and the first, second display panel 1-2PNL may be positioned outside the front surface 111a of the light guide part 111.

The light guide part 111 may reflect and guide a first image light L1 of the first, first display panel 1-1PNL at least once or more. The light guide part 111 may totally reflect the first image light L1 incident therein to guide the first image light L1 toward the user's eyes.

The first, first and first, second display panels 1-1PNL and 1-2PNL, which are components for generating a virtual image, may be implemented as a display device, for example, a liquid crystal display device (LCD), a plasma display panel device (PDP), a field emission display device (FED), an electroluminescence display device (ELD), an organic light emitting diode (OLED), an LCoS (liquid crystal on silicon substrate), an OLEDoS (organic light emitting device on silicon substrate), or an LEDoS (light emitting diode on silicon substrate).

In particular, the virtual reality device (100 in FIG. 1B) according to the embodiment of the present disclosure may preferably include the first, first and first, second display panels 1-1PNL and 1-2PNL configured using the OLEDoS which is formed using a wafer-based semiconductor process and are thus realized in a small size with a high resolution.

Although not shown in the drawings, in more detail, in the first, first and first, second display panels 1-1PNL and 1-2PNL made of OLEDoS a driving thin film transistor may be formed for each pixel area on the wafer substrate. Further, a first electrode connected to each driving thin film transistor, an organic light emitting layer emitting light on the first electrode, and a second electrode on the organic light emitting layer may be formed.

The organic light emitting layer may emit a white light. Alternatively, the organic light emitting layer may emit a red, green, or blue light for the corresponding pixel area.

The first and second electrodes and the organic light emitting layer formed therebetween may constitute a light emitting diode. In the first, first and first, second display panels 1-1PNL and 1-2PNL, the first electrode may be configured as an anode, and the second electrode may be configured as a cathode.

The first, first and first, second display panels 1-1PNL and 1-2PNL made of such the OLEDoS may generate the first and second virtual images, respectively.

Accordingly, the first and second image lights L1 and L2 output from the first, first and first, second display panel 1-1PNL and 1-2PNL are incident into the light guide part 111. The first image light L1 implemented from the first, first display panel 1-1PNL is guided by the semi-transmissive part 113 positioned inside the light guide part 111.

The semi-transmissive part 113 may include a reflective surface 113a that transmits a part of light and reflects another part of the light. The first image light L1 incident from the first, first display panel 1-1PNL is reflected by the reflective surface 113a to be emitted toward the rear surface 111b of the light guide part 111, so that the first image light L1 reaches the user's eye.

The second image light L2 incident from the first, second display panel 1-2PNL passes through the reflective surface 113a and is emitted toward the rear surface 111b of the light guide part 111, so that the second image light L2 also reaches the user's eye.

Accordingly, the user can see the first image light L1 output by the first, first display panel 1-1PNL and the second image light L2 output by the first, second display panel 1-2PNL.

At this time, the first image light L1 reaches within 30 degrees (±15 degrees), which is the central region range of the user's eye, and is formed of a first virtual image having a first resolution.

In addition, the second image light L2 reaches within 40 to 100 degrees, which is the peripheral region range of the user's eye, and is formed of a second virtual image having a second resolution lower than the first resolution.

Accordingly, the virtual reality image in which the second virtual image is superimposed along the edge of the first virtual image with the first virtual image as the center is provided to a user wearing the virtual reality device (100 of FIG. 1B) according to the embodiment of the present disclosure.

Accordingly, the virtual reality device (100 of FIG. 1B) according to the embodiment of the present disclosure can deliver a high-resolution image to the user to prevent an occurrence of pixelation, thereby improving a three-dimensional effect and a sense of reality, and a sense of immersion.

In addition, by making the second virtual image implemented within 40 to 100 degrees of the peripheral region range have a lower resolution than the first virtual image, the user is substantially provided with a high-resolution virtual reality image while a size of the virtual reality device (100 of FIG. 1B) does not increase, so the user can use a lightweight and thin virtual reality device (100 of FIG. 1B).

In this case, an optical lens part (not shown) may be further provided between the light guide part 111 and the first, first display panel 1-1PNL. The optical lens part may serve to change a path of the first image light L1. In this regard the optical lens part may include at least one projection lens capable of diffusing or condensing light using a refractive index such as a convex lens or a concave lens, and/or at least one collimation lenses capable of emitting incident light in parallel.

Accordingly, the first image light L1 output from the first, first display panel 1-1PNL is diffused or condensed through the optical lens part to reach the reflective surface 113a of the semi-transmissive part 113.

In addition, since the reflective surface 113a of the semi-transmissive part 113 has an aspherical shape toward the rear surface 111b of the light guide part 111, the first image light L1 can be efficiently focused without distortion.

In addition, the virtual reality device (100 of FIG. 1B) according to the embodiment of the present disclosure may include various configurations in addition to the display panel module PNL1 shown in FIG. 5. Hereinafter, in the virtual reality device (100 of FIG. 1B) according to the embodiment of the present invention, various examples of the display panel modules PNL1 are described.

FIGS. 6 to 12 are schematic views illustrating various display device modules of a virtual reality device according to an embodiment of the present disclosure, and also show optical paths therein.

Figure 6:
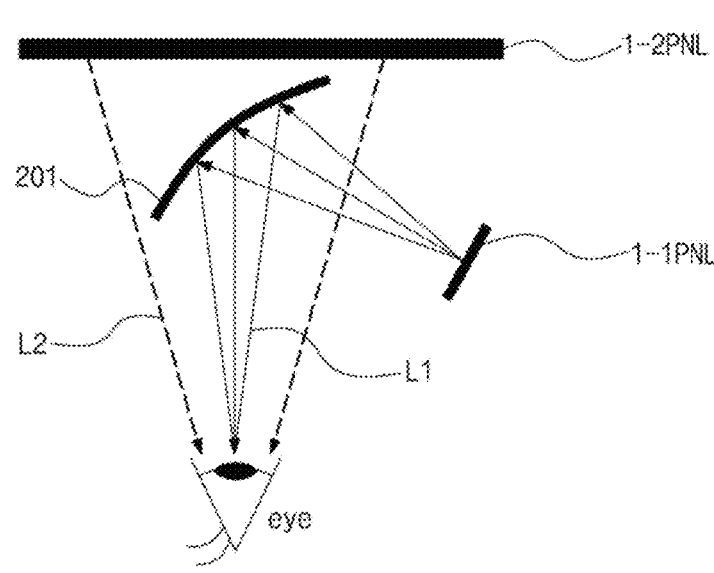
FIGS. 6 to 12 are schematic views illustrating various display device modules of a virtual reality device according to an embodiment of the present disclosure.

As shown in FIG. 6, a prism 201 may be positioned in front of the user's eye, and the prism 201 may diverge a light. Thus, a first image light L1 implemented from a first, first display panel 1-1PNL is reflected by the prism 201 so that the first image light L1 reaches the user's eye within 30 degrees (±15 degrees), which is the appropriate central region range of a viewing angle, and a second image light L2 implemented from a first, second display panel 1-2PNL positioned behind the prism 201 reaches the user's eyes within 40 to 100 degrees which is the peripheral region range.

Figure 7:
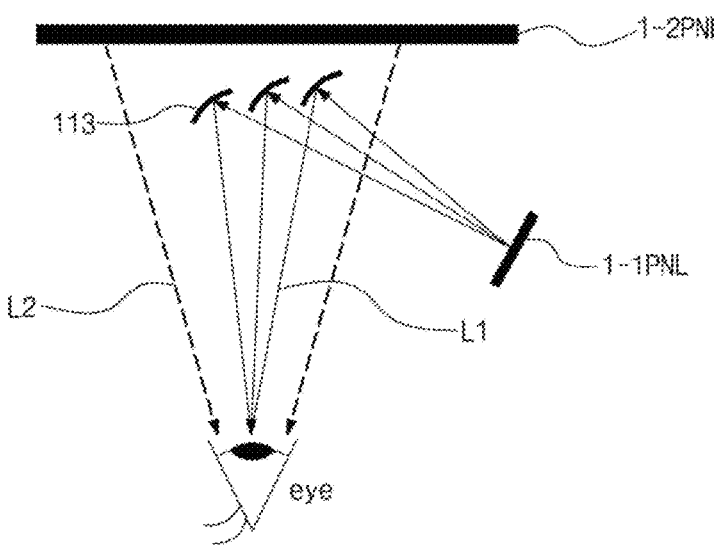

In addition, as shown in FIG. 7, a plurality of semi-transmissive parts 113 may be configured in front of the user's eye.

Therefore, a first image light L1 of a first, first display panel 1-1PNL is separated by each semi-transmissive part 113 so that the separated first image light L1 reaches the user's eye, thereby further achieving an effect of expanding an eyebox.

Figure 8:
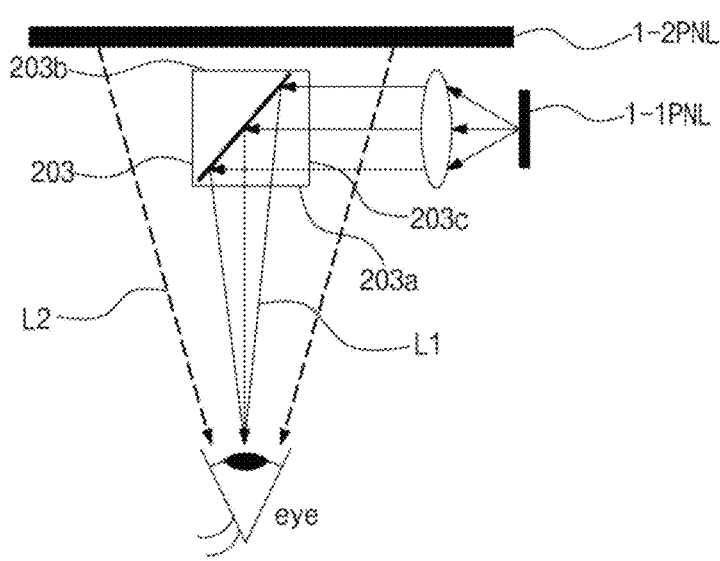

In addition, as shown in FIG. 8, a beam splitter 203 may be positioned in front of the user's eye.

Here, a surface facing the user's eye is defined as a front surface 203a of the beam splitter 203, a surface located at a rear of thereof is defined as a rear surface 203b, and side surfaces 203c connecting the front surface 203a and the rear surface 203b are defined. A first, first display panel 1-1PNL may be positioned on one side surface 203c of the beam splitter 203, and a first, second display panel 1-2PNL may be positioned on the rear surface 203b of the beam splitter 203.

Since the beam splitter 203 reflects a part of light and transmits a part of the light, the beam splitter 203 reflects a first image light L1 of the display panel 1-1PNL to make the first image light L1 reach the user's eye. Further, the beam splitter 203 transmits a second image light L2 of the first, second display panel 1-2PNL to make the second image light L2 reach the user's eye.

In this case, a half mirror or a polarization reflection mirror may be positioned instead of the beam splitter 203.

The half mirror may include a semi-transmissive material. For example, the half mirror may include a thin metal film such as magnesium (Mg), silver (Ag), or aluminum (Al).

In addition, the polarization reflection mirror is a selective polarizer that transmits linearly polarized light in a first direction and reflects linearly polarized light in a second direction, and may be configured with a wire grid polarizer.

Figure 9:
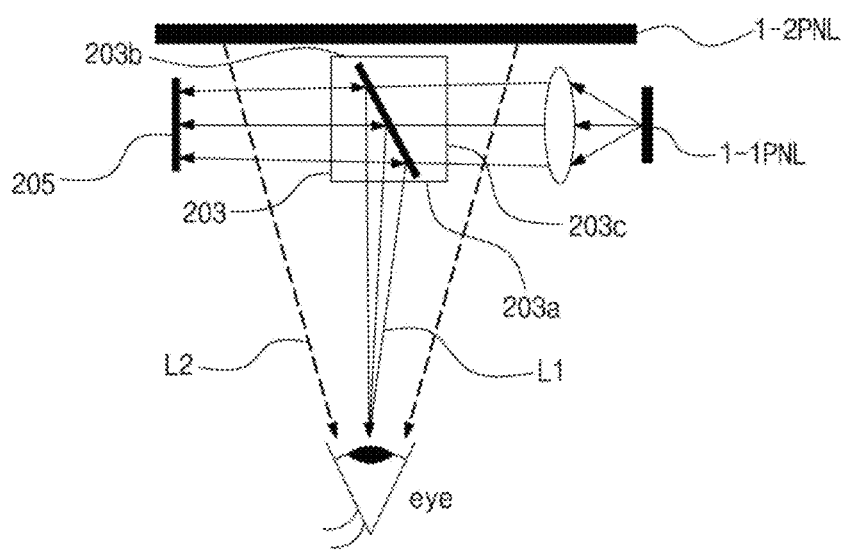

Also, as shown in FIG. 9, it may be configured that a first image light L1 implemented from a first, first display panel 1-1PNL passes through the beam splitter 203, then is reflected by the mirror 205 positioned on the other side of the beam splitter 203, and reaches the user's eye.

Figure 10:
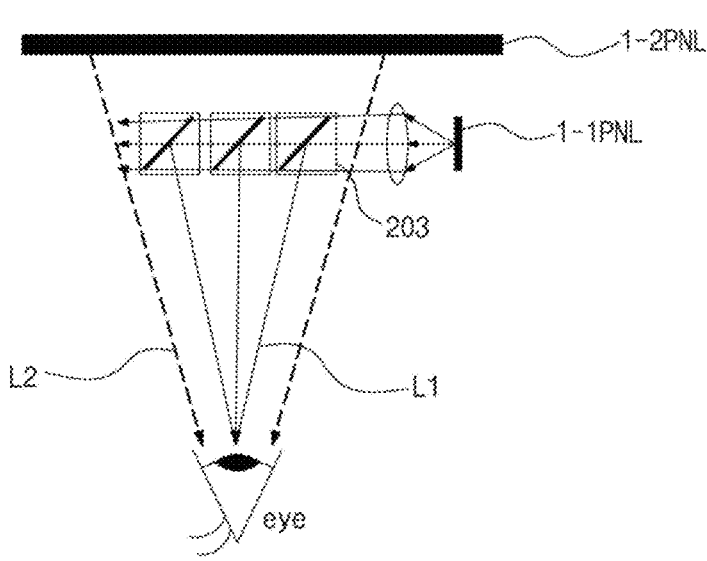

In addition, as shown in FIG. 10, a plurality of beam splitters 203 may be provided so that a first image light L1 implemented from a first, first display panel 1-1PNL is divided into a plurality of lights, which are reflected or transmitted by the beam splitters 203 and reach the user's eye.

Figure 11:
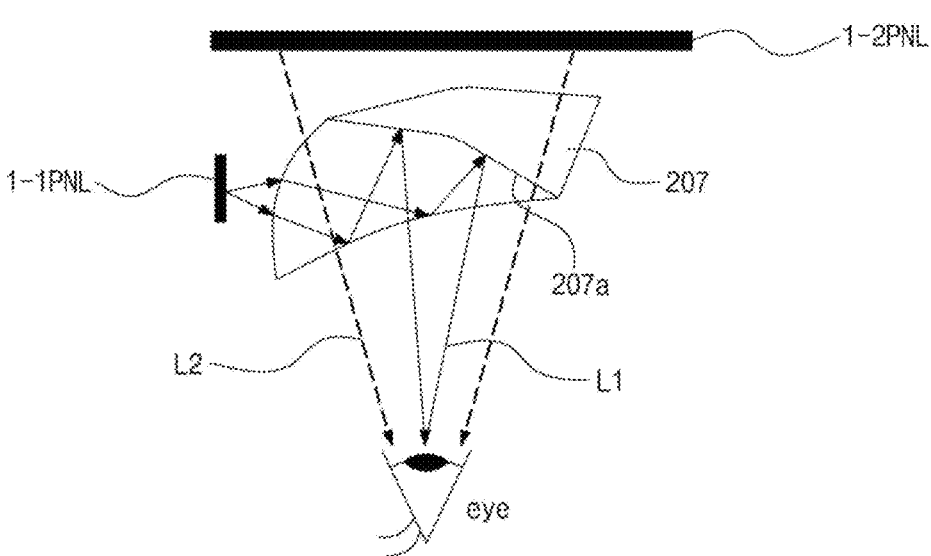

In addition, as shown in FIG. 11, a TIR (Total Internal Reflection) free-form curved surface prism 207 may be provided.

The TIR free-form curved prism 207 is positioned so that a concave reflective surface 207a faces the user's eye, and thus a first image light L1 implemented in a first, first display panel 1-1PNL is directed to the user's eye. In this case, a second image light L2 implemented in a first, second display panel 1-2PNL passes through the TIR free-form curve surface prism 207 as it is and is transmitted to the user's eye.

Figure 12:
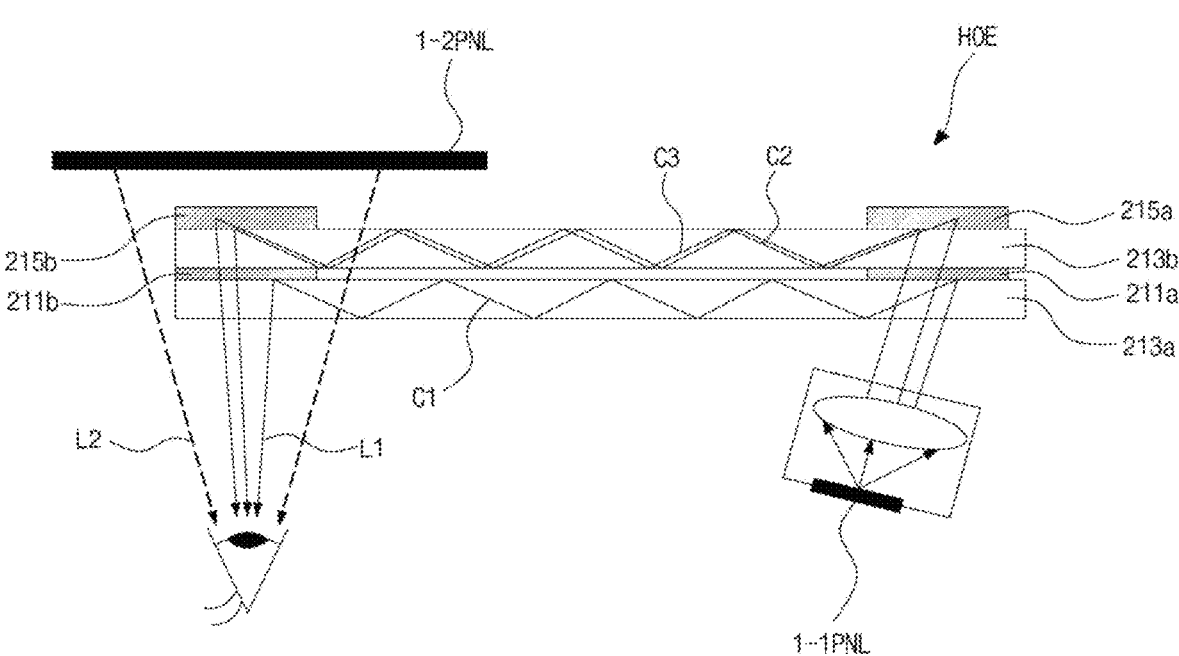

Also, as shown in FIG. 12, a display device module PNL1 of the virtual reality device according to the embodiment of the present disclosure may be formed of a holographic optical element HOE.

That is, a first light guide plate 213a including first and second optical pattern parts 211a and 211b for diffracting a first color light C1 among a first image light L1 implemented in a first, first display panel 1-1PNL, and a second light guide plate 213b including third and fourth optical pattern parts 215*a* and 215*b* for diffracting second and third color lights C2 and C3 among the first image light L1 are provided.

The first to fourth optical pattern parts 211*a*, 211*b*, 215*a* and 215*b* may diffract the incident light to change the path of the light. Each of the first to fourth optical pattern parts 211*a*, 211*b*, 215*a* and 215*b* may include a pattern recorded therein so that an angle of diffraction is determined according to a wavelength of light.

Accordingly, the first image light L1 implemented from the first, first display panel 1-1PNL is diffracted by the first to fourth optical pattern parts 211*a*, 211*b*, 215*a* and 215*b* to be transmitted to the user's eye. In this case, the second image light L2 implemented from the first, second display panel 1-2PNL is transmitted through the holographic optical element HOE to the user's eye.

Accordingly, a user wearing the virtual reality device 100 (100 of FIG. 1B) according to the embodiment of the present disclosure can see the first image light L1 output from the first, first display panel 1-1PNL and the second image light L2 output from the first, second display panel 1-2PNL. In this case, the user can receive the first virtual image of the first resolution within 30 degrees (±15 degrees) as the central region range by the first image light L1, and the second virtual image of the second resolution lower than the first resolution within 40 to 100 degrees as the peripheral region range by the second image light L2.

Accordingly, the user is provided with a virtual reality image in which the second virtual image is superimposed along the edge of the first virtual image with the first virtual image as the center.

Accordingly, the virtual reality device (100 of FIG. 1B) according to the embodiment of the present disclosure can deliver a high-resolution image to the user prevent pixelation, thereby improving a three-dimensional effect, a sense of reality and a sense of immersion.

In addition, by making the second virtual image implemented within 40 to 100 degrees of the peripheral region range have a lower resolution than the first virtual image, the user is substantially provided with a high-resolution virtual reality image while the size of the virtual reality device (100 of FIG. 1B) does not increase, so that the user can use a lightweight and thin virtual reality device (100 of FIG. 1B).

Meanwhile, in the above description, it is illustrated and described that the first virtual image and the second virtual image are cut out in a superimposing region in the process of mixing the first and second virtual images. However, the first and second virtual images may be implemented by superimposing each other without a separate cut-out.

That is, the first virtual image may be superimposed as an information image on the second virtual image, and the information image may be a basic information such as weather and time, or may be composed of various information of various peripheral devices.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:
   a first display panel realizing a first image light of a first resolution; and
   a second display panel realizing a second image light synchronized with the first image light, the second image light having a second resolution lower than the first resolution,
   wherein a second virtual image implemented by the second image light is superimposed with a first virtual image implemented by the first image light to implement a virtual reality image, and
   wherein the first display panel is disposed on a surface of the second display panel which outputs the second image light, the first display panel has a smaller size than the second display panel, and the first display panel overlaps with the second display panel.

2. The display device of claim 1, wherein the virtual reality image includes a region A of a center portion corresponding to 30 degrees i.e., ±15 degrees which is a central viewing angle region range of a user's eye, and a region B which corresponds to 40 to 100 degrees which is a peripheral viewing angle region range of the user's eye and surrounds an edge of the region A.

3. The display device of claim 2, wherein the virtual reality image has the first virtual image implemented in the region A, and the second virtual image implemented in the region B.

4. The display device of claim 3, wherein the second virtual image is cut out corresponding to the region A, and the first virtual image is cut out corresponding to the region B.

5. The display device of claim 3, wherein a boundary portion between the first virtual image and the second virtual image of the virtual reality image is blurred.

6. The display device of claim 5, wherein an edge of the first virtual image is blurred.

7. The display device of claim 3, wherein an edge region of the first virtual image has a resolution between the first resolution and the second resolution.

8. The display device of claim 1, wherein the first resolution is 1000 PPI or higher, and the second resolution is 100 PPI or higher.

9. The display device of claim 1, wherein each of the first and second display panels includes:
   a substrate including a plurality of pixel areas;
   a first electrode disposed in each pixel area on the substrate;
   an organic light emitting layer disposed on the first electrode; and
   a second electrode disposed on the organic light emitting layer.

10. The display device of claim 1, wherein the second display panel includes a first portion overlapping with the first display panel, and a second portion and a third portion which are on both sides of the first portion and do not overlap with the first display panel.

* * * * *